United States Patent [19]
Faber

[11] Patent Number: 5,369,745
[45] Date of Patent: Nov. 29, 1994

[54] ELIMINATING LIVELOCK BY ASSIGNING THE SAME PRIORITY STATE TO EACH MESSAGE THAT IS INPUTTED INTO A FLUSHABLE ROUTING SYSTEM DURING N TIME INTERVALS

[75] Inventor: Vance Faber, Los Alamos, N. Mex.

[73] Assignee: The United States of America as represented by the United States Department of Energy, Washington, D.C.

[21] Appl. No.: 860,391

[22] Filed: Mar. 30, 1992

[51] Int. Cl.$^5$ .......................................... G06F 13/372
[52] U.S. Cl. ...................... 395/200; 395/725; 370/85.6; 364/949.91; 364/950; 364/DIG. 2
[58] Field of Search .................. 395/200, 550; 370/60, 370/60.1, 94.1, 94.2, 85.6, 725; 340/825.5

[56] References Cited

U.S. PATENT DOCUMENTS

| | | | |
|---|---|---|---|
| 4,466,060 | 8/1984 | Riddle | 364/200 |
| 4,742,511 | 5/1988 | Johnson | 370/94 |
| 5,218,676 | 6/1993 | Ben-Ayed et al. | 395/200 |

OTHER PUBLICATIONS

Blazewicz et al, "Time-Stamp Approach to Store-and-Forward Deadlock Prevention", IEEE Transactions on Communications vol. COM-35, No. 5, May 1987, pp. 490-495.
B. J. Smith, "Architecture and Application of the HEP Multiprocessor Computer System," SPIE 298:241 (1981).
S. Konstantinidou et al., "The Chaos Router: A Practical Application of Randomization in Network Routing," IEEE Proc. 19th Intl. Symp. Computer Arch., pp. 212-221 (May 1991).
S. Konstantinidou et al., "Chaos Router: Architecture and Performance," ACM Proc. 2nd Symp. Parallel Algorithms and Arch., pp. 21-30 (1990).

Primary Examiner—Thomas C. Lee
Assistant Examiner—Fran R. Faller
Attorney, Agent, or Firm—Ray G. Wilson; William A. Eklund; William R. Moser

[57] ABSTRACT

Livelock-free message routing is provided in a network of interconnected nodes that is flushable in time T. An input message processor generates sequences of at least N time intervals, each of duration T. An input register provides for receiving and holding each input message, where the message is assigned a priority state p during an nth one of the N time intervals. At each of the network nodes a message processor reads the assigned priority state and awards priority to messages with priority state (p−1) during an nth time interval and to messages with priority state p during an (n+1) th time interval. The messages that are awarded priority are output on an output path toward the addressed output message processor. Thus, no message remains in the network for a time longer than T.

7 Claims, 2 Drawing Sheets

ELIMINATING LIVELOCK BY ASSIGNING THE SAME PRIORITY STATE TO EACH MESSAGE THAT IS INPUTTED INTO A FLUSHABLE ROUTING SYSTEM DURING N TIME INTERVALS

This invention is the result of a contract with the Department of Energy (Contract No. W-7405-ENG-36).

BACKGROUND OF THE INVENTION

This invention relates to message routing in computer networks and, more particularly, to resolving issues of priority in network message transmissions.

Signal transmission networks generally receive input signals from a source, transmit those signals along a network of paths that are internally connected at nodes, and output the signal at the desired location. When substantial use of the network is occurring two or more messages may arrive at a network node and require the same output path for retransmission of the messages to their respective destinations. When this happens, the node must be capable of determining the message that will be first connected to the output path, i.e., conflict resolution must occur.

There are two types of critical properties that can be associated with these priority schemes. The first is "flushability": a routing scheme is flushable in time T if, given any configuration of packets in the network and no more packets entering the network, all packets in the network exit within time T. The second is associated with "livelock": a routing scheme is livelock free if there is a constant S such that any packet entering the network is guaranteed to reach its destination in time S. Clearly, a livelock free network must be flushable and $S \geq T$.

There are many different schemes for conflict resolution along computer networks. In an oblivious router, an input frame is immediately routed to the output frame for the preferred path to the message destination. If the output frame is not available, the message is held in the input frame until the desired output frame becomes available. Succeeding messages are delayed until the message in the input frame is transmitted.

In a deflection router, messages arriving at a node are guaranteed to leave the node in the next routing cycle. If possible, each message is assigned to an output channel that reduces the distance to the destination, with priority given to messages with only a single profitable direction. Any remaining messages are randomly assigned to the remaining free output channels. Thus, messages are deflected and delayed within the system until they arrive at a node with no conflict or have only a single profitable direction from which to leave a node.

Another router is the chaos router where messages include a routing header that determines a set of equally profitable channels from which the message might leave a node. The first available channel is selected for routing. Messages that do not have an available profitable channel are stored in a small buffer queue and the first message in the queue that can profitably use an available output channel is assigned to that channel. If the queue is completely full, the next incoming message will cause a message to be randomly selected from the queue and derouted along the first available channel to create room for the newly arriving message.

Desparation routing (often called "hot potato" routing) is a resource efficient method of adaptive routing in packet switching communication networks. Examples of classes of priority schemes are collision counting and distance routing. Collision counting involves incrementing a counter each time a packet is misrouted. In resolving conflicts, some function of the counter has priority (equality is resolved randomly). In distance routing schemes, conflicts are resolved by measuring priority with some function of the distance a packet has remaining to its destination.

In one variation of the collision counting scheme, the collision counter is used to directly assign priority, but when the collision counter reaches a selected maximum value, the packet goes "Eulerian", i.e., the packet follows a predetermined Eulerian path that traverses each wire of the network once and only once. This scheme is flushable and livelock free, but has two flaws: first, any packet that goes Eulerian must follow the Eulerian path even if shorter paths to the destination become available, incurring a large unneeded time penalty; second, Eulerian packets are undesirable so the counter is set to a large count thereby adding many unwanted bits to the message packet header.

Accordingly, it is an object of the present invention to provide a livelock free priority assignment system that requires only a minimum number of priority bits in a message header.

It is another object of the present invention to minimize the time penalty associated with a livelock-free system.

Yet another object of the present invention is to provide that all messages will exit a transmission network within a known time.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise message routing apparatus for preventing livelock in a network of interconnected nodes, where the network is flushable in time T and each one of the nodes has a plurality of input and output paths. An input message processor has an interval timer for generating sequences of at least N time intervals, each of duration T, a register for receiving and holding the input message, and means for assigning a priority state p to the messages in the register during an nth one of the N time intervals. An output message processor is connected to the input message processor through the network. A node message processor is provided at each of the nodes and has a means for reading the priority state on each of the messages, logic means for awarding priority to messages with priority state $(p-1)$ during the nth time interval and messages with priority state p during an $(n+1)$th time interval and a means for outputting the message that is awarded priority on a one of the output paths toward the output message processor.

In another characterization of the present invention, a method is provided for routing a digital message through a network of interconnected nodes, where the network has a flushable time T, and each of the nodes has a plurality of input and output paths. A sequence of N time intervals is generated, each of duration T. A priority state p is determined by an nth time interval and assigned to each digital message generated during the nth time interval. The message priority state is determined at each node so that messages with priority state (p−1) have priority during the nth time interval and messages with priority state p have priority during an (n+1)th time interval. Messages having priority state of (p−1) are flushed from the network during the nth time interval so that no message remains in the system for a time longer than T.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE DRAWINGS

Figure 1:
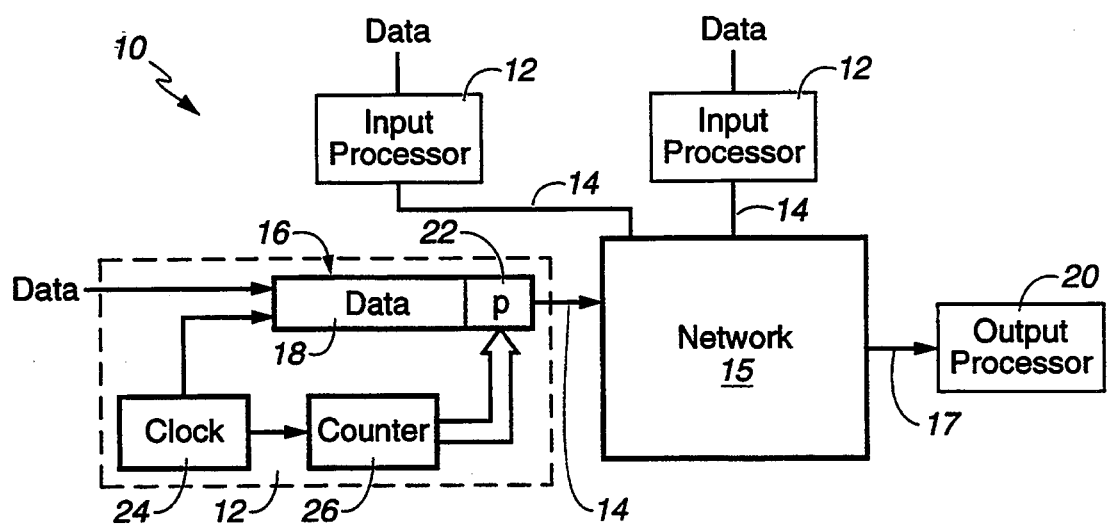
FIG. 1 is a schematic diagram in block diagram form of a data processing system having input processing according to one embodiment of the present invention.

In accordance with the present invention, as few as a single priority bit may be added to a message priority statement in any flushable scheme in order to obtain a message routing system that is livelock free without incurring any unneeded time penalties. One example of a flushable system is a reciprocal distance routing scheme where a highest priority is assigned to message packets that are closest to their destination and the lowest priority is assigned to packets that are farthest away from their destination.

Many routing schemes conventionally provide routing routines that track the distance a given packet is from its destination, e.g., U.S. Pat. No. 4,742,511, issued May 3, 1988, to Johnson. For any configuration of packets in the network and with no new packets entering the network, consider the set of packets that have the lowest distance remaining among all the packets in the network. Upon reaching a node in the network, some of these packets will have their exit port request honored and move to a distance state one closer to the destination. In at most k steps, where k is the maximum distance between any two nodes in the network, some packet will leave the network. Thus, this scheme is flushable in time T, a time that is certainly no greater than the total number of packets contained in the network times the maximum distance K and duration of each clock pulse. The present invention assigns one or more extra priority bits to transform any scheme flushable in time T into a scheme that is livelock free. Consider a sequence of N time intervals, each of duration T, with extra priority bits to assign a priority state p to an nth one of said N time intervals. The priority bits are added to the message as the message enters the network as follows: priority state (p−1) is assigned during the (n−1)th time interval, i.e., for T clock counts; priority state p is assigned during the nth time interval for T clock counts; etc. Priority is assigned cyclically: state p is higher than state (p−1), etc. These priorities take precedence over any other priorities and, once assigned, are never changed and remain constant as long as the packet remains in the network.

First note that at any given time the network can never contain packets with more than two of the priority states, e.g., (p−1) and p. This is certainly true initially when all the packets are entering with priority state 1. By the time the priority state 3 packets enter, the priority state 1 packets will have exited since there are T time steps in which the priority state 1 packets have highest priority in the network and no more priority state 1 packets are entering. Thus, the flushability removes the priority state 1 packets before the priority state 3 packets enter. Similarly, the priority state 2 packets will exit during the time priority state 3 packets are entering and before priority state 4 packets enter.

Thus, generally priority state (p−1) packets will exit during the time priority state p packets are entering and before priority state (p+1) packets enter. This continues throughout the N time intervals. The N time intervals may be repeated continuously to provide a livelock free system. Note that newly entering packets may be bumped out of the way by old packets in the network, but within T steps they will reach the highest priority and act as if the flushable scheme is imposed on them. Thus, the highest priority packets route normally to their destination, but low priority packets remain free to take the shortest possible path at any time that conflicts are not occurring.

It will be apparent from the above description that a livelock free system may require only one extra priority bit using two priority states A and B. Then priority state A is assigned for T clock counts, priority state B for T clock counts, priority state A for T clock counts, and so on. The node processors give priority state B top priority during the T clock counts in which priority state A is being assigned and they give priority state A top priority during the time in which priority B state is being assigned.

In a preferred embodiment, two extra priority bits are used with four available priority states, three of which are used, herein denoted A, B, and C. As before, these states are preset as the packet enters the network by the following schedule: priority state A is assigned to all packets for T clock counts, then priority state B for T clock counts, then priority state C for T clock counts, then priority state A for T clock counts, and so on. Priority state A is higher than priority state B, priority state B is higher than priority state C, and priority state C is higher than priority state A. In this embodiment possible ambiguities between the priority assignment and the clock cycles are eliminated.

Referring now to FIG. 1, there is shown a block diagram of data processing system 10, with a plurality of input processors 12 for inputting message packets along input paths 14 to network 15 for transmission along a path of interconnected nodes (not shown) to one or more output paths 17 for processing by an output processor 20. Each input processor 12 may include an input data register 16 having sufficient capacity for data storage 16 and priority state header assignment 22. Clock 24, which be a dedicated synchronized clock or may be a system clock, clocks data through register 16 and assigns priority state bits to message header 22 by counter 26. Counter 26 may be provided in software or may be hardware that provides a priority state bit output that maintains a livelock free system.

Figure 2:
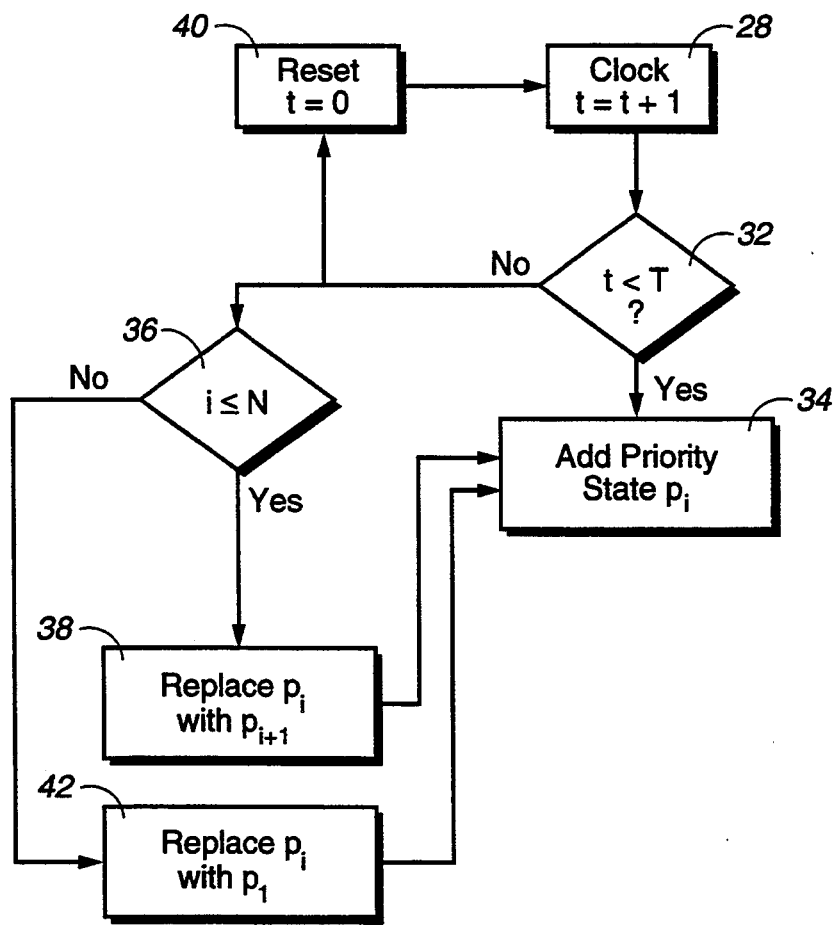
FIG. 2 is a flow diagram of a method for assigning priority bits to incoming messages according to one embodiment of the present invention.

FIG. 2 depicts a block flow diagram of a method for assigning priority state bits for message header 22 (FIG. 1). Clock 28 provides a clock count to comparator 32 that determines if the clock count is within a flushable time period T. As long as the clock count is within a flushable time interval, a selected priority state $P_i$ is added 34 to message header 22 (see FIG. 1). As soon as the clock count reaches the flushable time period T, however, comparator 36 determines if the count interval is within a preselected number N of time intervals. Reaching the end of a flushable time period T also sends a reset signal 40 to clock counter 28.

If the count interval is a time interval n within N, the priority state $p_i$ is incremented to $p_{i+1}$ and the incremented priority state replaces 38 $p_i$ as the priority state for the next time interval. If the count interval has exceeded N, priority state $p_i$ is replaced with priority state $p_1$ 42 and the priority cycle begins again.

Figure 3:
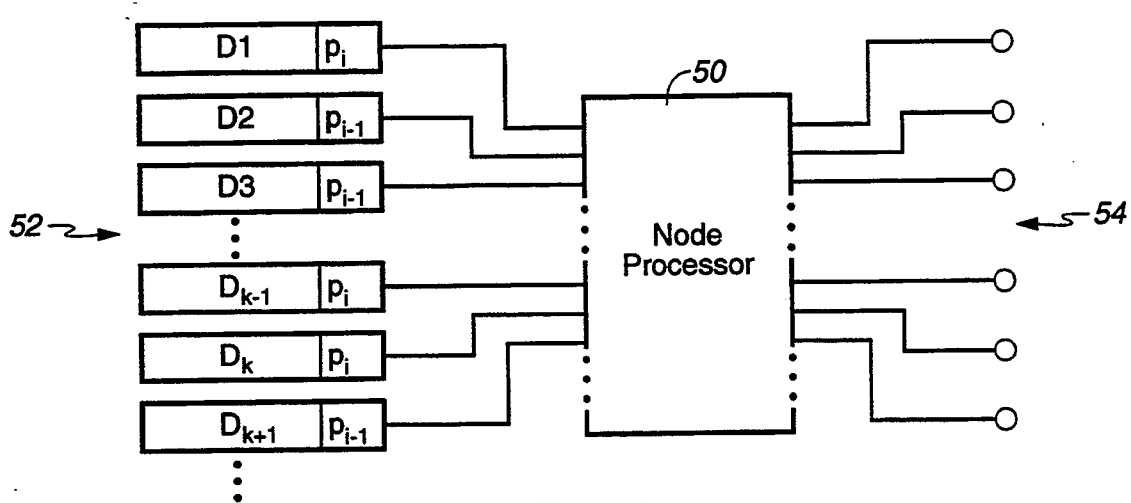
FIG. 3 is a schematic diagram in block diagram form of a node within the network.

Thus all messages input from input processors 12 (FIG. 1) have the same priority state assignment during any nth time interval of T clock counts. At any given time there are at most two priority states in the system, as discussed above. As shown in FIG. 3, the message packets arriving at nodes within network 15 (FIG. 1) may be placed in input registers 52 with priority state assignments $p_i$ and $p_{i-1}$ for processing by node processors 50. Node processors 50 determine the profitable output paths 54 for each input message 52 and resolve conflicts for the use of profitable output paths, with priority state (p−1) messages awarded priority over priority state p messages.

Figure 4:
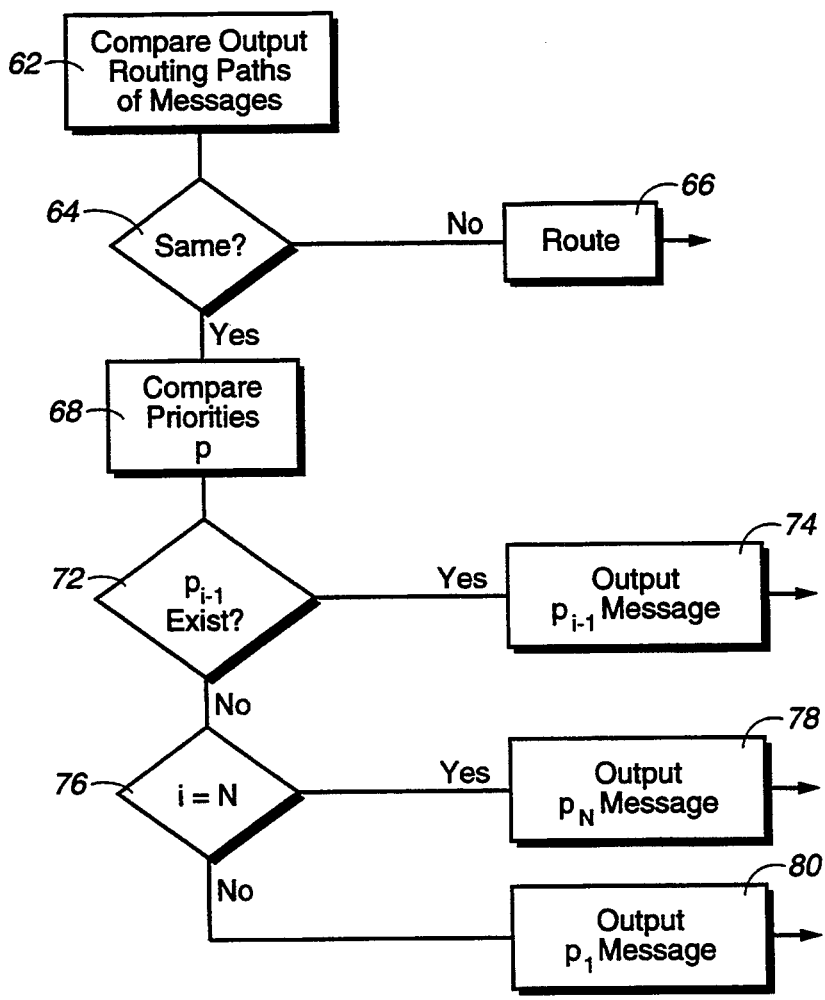
FIG. 4 is a flow diagram of a method for outputting messages that are input to the node processor shown in FIG. 3.

FIG. 4 depicts a processor flow diagram for assigning output paths. Input message headers are first examined 62 to determine profitable output routing paths and the output routing paths are compared 64 to determine if a conflict exists between messages for profitable routing paths. If no conflict exists, a message is simply routed 66 along its profitable output route. If a conflict does exist, the message header is then examined for priorities and the priorities of the conflicting messages are compared 68. If two priority states $p_{i-1}$ and $p_i$ exist 72, then priority state $p_{i-1}$ is selected and the message with priority state $p_{i-1}$ is output 74. If there is no priority state (p−1) and the time interval count i is equal to the selected number of time intervals N 76, messages with priority state $p_n$ are output 78. If i≠N then priority state $p_1$ messages are output 80. Thus, node processor 50 (see FIG. 3) cyclically selects the highest priority messages within the time T to flush messages through the system. Each message attains the highest priority state within a time T and thereafter exits the system within a next cycle time T.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Message routing apparatus for preventing livelock in a network of interconnected nodes, said network having a flushable time T and each one of said nodes having a plurality of input and output paths, said message routing apparatus comprising:

an input message processor having an interval timer for generating a sequence of at least N time intervals, $n_1$ through $n_N$, a register for receiving input messages, and means for assigning a priority state p to each one of said input messages in said register during a nth time interval of said N time intervals, where each nth time interval is of duration T;

an output message processor connected to said input message processor through said network; and a node message processor at each one of said nodes having means for reading said priority state on each arriving message, logic means for awarding priority to said arriving messages with priority state (p−1) during said nth time interval and to said arriving messages with priority state p during an (n+1)th time interval, and means for outputting said arriving message awarded priority on a one of said output paths toward said output message processor.

2. Apparatus according to claim 1, wherein said interval timer generates three time intervals.

3. Apparatus according to claim 1, where said interval timer generates two time intervals.

4. A method for routing a digital message through a network of interconnected nodes, said network having a flushable time T and each one of said nodes having a plurality of input and output paths, said method comprising the steps of:

generating a sequence of N time intervals, $n_1$ through $n_N$, each nth time interval having a duration T;

assigning each said digital message generated during an nth time interval of said N time intervals a priority state p;

inputting each said digital message with said priority state p to said network during said nth time interval; and determining the message priority at each one of said nodes so that digital messages with priority state (p−1) have priority during said nth time interval and digital messages with priority state p have priority during an (n+1)th time interval, wherein digital messages with said priority state (p−1) are flushed from said network during said nth time interval.

5. A method according to claim 4 wherein said N time intervals are generated repetitively 6. A method according to claim 5, wherein N is equal to two.

7. A method according to claim 5, wherein N is equal to three.

* * * * *